March 1, 1932. T. B. FISHER 1,847,391
PROTECTING LINER FOR PLUG SEATS OF TUBES
Filed July 7, 1930
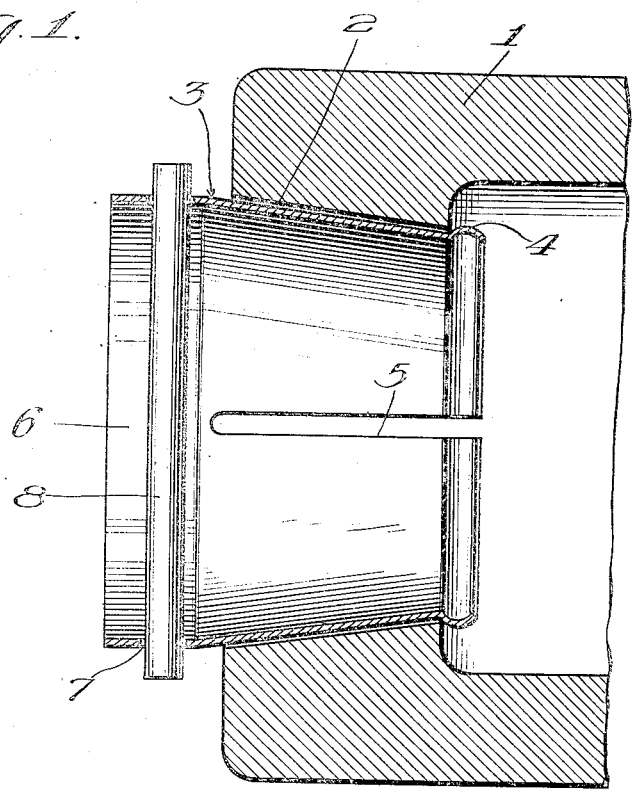
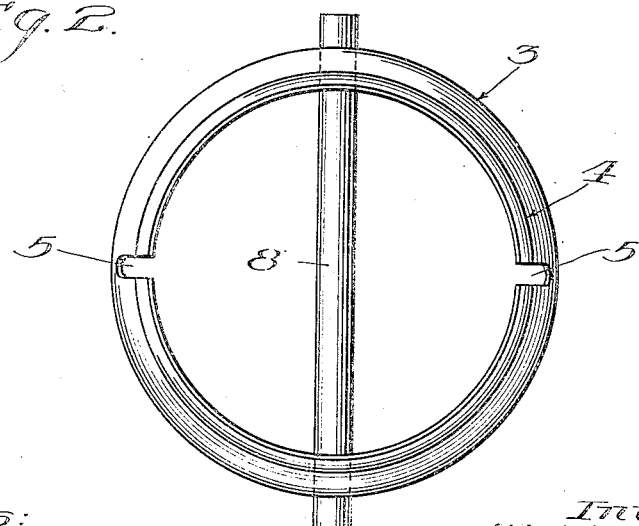
Witness:
Stephen A. Nelson
Inventor.
Teddy B. Fisher
By Frank L. Belknap
Atty.

Patented Mar. 1, 1932

1,847,391

UNITED STATES PATENT OFFICE

TEDDY B. FISHER, OF CHICAGO, ILLINOIS, ASSIGNOR TO UNIVERSAL OIL PRODUCTS COMPANY, OF CHICAGO, ILLINOIS, A CORPORATION OF SOUTH DAKOTA

PROTECTING LINER FOR PLUG SEATS OF TUBES

Application filed July 7, 1930. Serial No. 466,086.

This invention relates to improvements in protecting sleeves or liners for use with pipe or tube fittings such as return bends, T's and the like, and refers specifically to the provision of a sleeve or liner which may be used either with fittings employing a ground joint, a threaded joint or any conventional junction means, and may protect said joint against damage from tools used in cleaning or rolling the tubes, in removing a damaged tube from the fitting, or the like.

The objects, utility, and advantages of my invention will be apparent from the accompanying drawings and following detail description.

In the drawings, Fig. 1 is a fragmentary sectional elevation of my invention as applied to a tube end.

Fig. 2 is an end elevational view of the device.

Referring in detail to the drawings, 1 indicates the end portion of a tube or fitting which may be used in the tube bank of a steam boiler cracking still or the like. The tubes in such installations are subjected to deposits on their inner surfaces. For instance, in steam boilers a scale forms upon the inner surface of the tube which not only decreases the effective area of the tube itself, but serves as an insulating means against heat. Whereas, in oil cracking tubes a deposit of coke or tar forms on the inside of the tube and in time renders the tube inoperative. At periodic intervals these tubes are cleaned by scraping or grinding the scale or coke deposits from the inner surfaces of the tubes. In accomplishing this result it frequently happens that the cleaning tools cut or gouge the ground or threaded joints which connect the tubes with various fittings, such as T's and U-bends. Also, in the rolling operation such joints are injured by the rolling tools.

The tube or fitting 1 may be provided with a tapered round or threaded seat 2 which may be adapted to register with the joining end of an adjacent tube, U-bend, T, or the like (not shown).

In order to protect the surface 2 of the joint a tapered metallic sleeve 3 may be utilized and may be formed in the shape of a truncated cone to fit the taper of the thread or other joint 2 to which it is to be applied. A bead 4 or other suitable projection may be provided at the small end of the sleeve 3 and may be slightly larger in diameter than the inner end of the threaded or ground joint 2 in the fitting 1. The sleeve 3 may be provided with a longitudinal slot 5 which permits contraction of the small end of the sleeve 3 when the same is slipped through the portion of the fitting to be protected.

When the sleeve 3 is disposed in operative position the bead 4 will expand beyond the inner end of the thread or ground portion 2 of the fitting, thus preventing the sleeve from backing out of said fitting. The conical taper of the sleeve 3 may prevent its slipping too far into the fitting 1.

It is to be understood, of course, that the bead 4 may take any desired form so long as it will be upraised or of greater diameter than the inner end of the joint 2 when the sleeve is in operative position. It is to be further understood that the number and shape of the slots 5 may be varied as desired so long as an element of resiliency is imparted to the bead or other projection 4 when the same is inserted in position.

That portion of the large end 6 of the sleeve 3 which may project outside the fitting may be provided with diametrically opposite apertures 7 through which a removable rod 8 may be temporarily inserted to serve as a handle when the sleeve is being slipped into or out of position. The sleeve may be removed after it has served its purpose by simply inserting the rod through aperture 7 and pulling out the sleeve. When this pulling pressure is exerted the bead 4 at the small end of the sleeve will contract due to the provision of the slots 5 permitting easy removal of the sleeve.

I am aware that many modifications of my invention may be devised without departing from the spirit thereof, and hence I do not wish to be limited except as necessitated by the prior art.

I claim as my invention:

1. In combination, a protecting sleeve for a ground or threaded joint which comprises a tapered tube, a bead formed upon the small end of the tube, a slot opening to the edge of said bead, the outer surface of said tube being adapted to contact said ground or threaded joint, and an uninterrupted circumferentially extending portion at the larger end of said tube designed to receive means for removing said tube.

2. In combination, a protecting sleeve for a ground or threaded joint which comprises a tapered tube, a bead formed upon the small end of the tube, a slot opening to the edge of said bead, the outer surface of said tube being adapted to contact with said ground or threaded joint, and a circumferentially extending uninterrupted portion designed to receive an element for removing said tube.

3. In combination with a tube having an internal outwardly flared opening and a portion of relatively increased internal diameter substantially immediately below said opening, a protecting sleeve for the flared opening, having a securing means engaging below the portion of narrow diameter of said opening and an uninterrupted circumferentially extending portion at the larger end of said sleeve designed to receive an element for removing said sleeve from said opening.

4. In combination with a tube having an internal outwardly flared opening and a portion of relatively increased diameter substantially immediately below said opening, a protecting sleeve therefor provided with an expansile and contractile skirt, said skirt carrying a securing means engaging below the portion of narrow diameter of said opening and an uninterrupted circumferentially extending portion at the outer end of said sleeve designed to receive an element for removing said sleeve from said opening.

In testimony whereof I affix my signature.

TEDDY B. FISHER.